United States Patent
Rorie

(10) Patent No.: US 7,760,622 B2
(45) Date of Patent: *Jul. 20, 2010

(54) REDUNDANT ROUTER SET UP

(75) Inventor: Heather N. Rorie, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

This patent is subject to a terminal disclaimer.

(21) Appl. No.: 12/150,369

(22) Filed: Apr. 28, 2008

(65) Prior Publication Data

US 2008/0205264 A1 Aug. 28, 2008

Related U.S. Application Data

(63) Continuation of application No. 10/765,655, filed on Jan. 27, 2004, now Pat. No. 7,403,474.

(51) Int. Cl.
*G01R 31/08* (2006.01)
(52) U.S. Cl. .................. 370/219; 370/228; 370/392
(58) Field of Classification Search ......... 370/216–221, 370/225–228, 389, 392, 254, 400, 401; 709/239, 709/225, 245, 223; 714/4, 46, 47, 56
See application file for complete search history.

(56) References Cited

U.S. PATENT DOCUMENTS

| | | | |
|---|---|---|---|
| 5,313,465 A * | 5/1994 | Perlman et al. | 370/254 |
| 5,907,610 A | 5/1999 | Onweller | |
| 5,949,753 A | 9/1999 | Alexander, Jr. et al. | |
| 6,295,276 B1 | 9/2001 | Datta et al. | |
| 6,493,341 B1 | 12/2002 | Datta et al. | |
| 6,587,434 B1 | 7/2003 | Cousins | |
| 6,594,229 B1 | 7/2003 | Gregorat | |
| 6,606,650 B2 | 8/2003 | Hughes et al. | |
| 6,628,649 B1 | 9/2003 | Raj et al. | |
| 2005/0177762 A1 * | 8/2005 | Singh et al. | 714/4 |
| 2005/0198381 A1 | 9/2005 | Rorie | |

* cited by examiner

*Primary Examiner*—Ian N Moore

(57) ABSTRACT

Methods, systems, and devices are provided for controlling the power level of voice signal streams. One embodiment of a network device having router functionality includes a processor, memory in communication with the processor, and program instructions. The program instructions can be stored in memory and executable on the processor to designate a fail-over virtual router interface for a first physical router on a second physical router based on addressing information obtained via communication between the first physical router and the second physical router.

15 Claims, 4 Drawing Sheets

| ROUTER - 1 CONFIGURATION | EXPLANATION |
|---|---|
| SWITCH (VLAN-5) # IP ADDRESS 10.1.1.1/24 | CONFIGURES THE IP ADDRESS OF THE ROUTER INTERFACE IN VLAN 5 |
| SWITCH (CONFIG) # RRP DOMAIN 2 | SETS THE IDENTITY OF THE PROTECTION DOMAIN |
| SWITCH (CONFIG) # RRP ROUTER 1 | SETS THE RRP ROUTER NUMBER |
| SWITCH (CONFIG) # RRP INSTANCE 1 5 | CREATES THE RRP VIRTUAL ROUTER INTERFACE |
| SWITCH (CONFIG) # RRP INSTANCE 2 5 IP 10.1.1.2/24 | IDENTIFIES THE VIRTUAL ROUTER INTERFACE ON ROUTER-2 FOR WHICH ROUTER-1 IS PROVIDING FAIL-OVER PROTECTION |
| SWITCH (CONFIG) # RRP | ENABLES RRP OPERATION ON ROUTER-1 |
| SWITCH (CONFIG) # WRITE MEMORY | SAVES THIS CONFIGURATION TO STARTUP MEMORY |

| ROUTER - 2 CONFIGURATION | EXPLANATION |
|---|---|
| SWITCH (VLAN-5) # IP ADDRESS 10.1.1.2/24 | CONFIGURES THE IP ADDRESS OF THE ROUTER INTERFACE IN VLAN 5 |
| SWITCH (CONFIG) # RRP DOMAIN 2 | SETS THE IDENTITY OF THE PROTECTION DOMAIN |
| SWITCH (CONFIG) # RRP ROUTER 2 | SETS THE RRP ROUTER NUMBER |
| SWITCH (CONFIG) # RRP INSTANCE 2 5 | CREATES THE RRP VIRTUAL ROUTER INTERFACE |
| SWITCH (CONFIG) # RRP INSTANCE 1 5 IP 10.1.1.1/24 | IDENTIFIES THE VIRTUAL ROUTER INTERFACE ON ROUTER-1 FOR WHICH ROUTER-2 IS PROVIDING FAIL-OVER PROTECTION |
| SWITCH (CONFIG) # RRP | ENABLES RRP OPERATION ON ROUTER-2 |
| SWITCH (CONFIG) # WRITE MEMORY | SAVES THIS CONFIGURATION TO STARTUP MEMORY |

*Fig. 3*

REDUNDANT ROUTER SET UP

PRIORITY INFORMATION

This application is a continuation of U.S. application Ser. No. 10/765,655, filed Jan. 27, 2004 now issued as U.S. Pat. No. 7,403,474, the specification of which is incorporated herein by reference.

INTRODUCTION

In a network environment, routers can be used to transfer data packets from one network, such as a Local Area Network (LAN) or a Wide Area Network (WAN) to another. Routers are also used to balance traffic within workgroups of a network. Routers can also provide filtering of inter or intra network traffic for security purposes and policy management. Router functionality can also be incorporated into other devices within a network environment, such as a switch, a bridge, a hub, or a file server, and, therefore, the functionality within these devices can also be viewed as a router.

A number of routers can be connected between a number of network clients and various network equipment, such as those mentioned above. In some situations, these routers can go offline or malfunction. For example, during a power outage the router may lose power and the network connection is lost. Additionally, a router can become overloaded with information and can shut itself down to protect itself or can be overwhelmed by the information such that the router becomes "frozen." In such cases, the data in transit through the router can be lost.

To save the data in transit, router redundancy protocols (RRPs), such as XRRP (XL Router Redundancy Protocol created by Hewlett Packard) or VRRP (Virtual Router Redundancy Protocol created by Cisco Systems) have been developed to allow a number of routers to be configured such that each router can provide a back up for another router.

RRPs provide back up router functionality in situations in which if a router fails, another router can automatically take over the routing function of the failed router. In this way, the data stream passing through a router that fails which would have resulted in a loss of data can be avoided and an increase in the continuity of the connection with the routers can be provided.

RRPs operate such that one router can backup another through creation of a virtual router interface on a router. A virtual router is an emulation of a physical router through use of program instructions (e.g., software). The program instructions can execute to utilize the same functions as a physical router, and therefore, can include various executable instructions for configuration, deployment, operation, troubleshooting, monitoring, and accounting functionality, among others. Routers that are used to backup other routers include a physical router interface and a virtual router interface provided thereon. The physical router interface provides the router functionality for the router on which it resides. Additionally, the virtual router interface provides a back up that can be used if the other router in the pair fails.

For example, a first router has a physical router interface for providing its router functionality. The first router also has a virtual router interface that acts as a backup router for a second router. In this way, the virtual router interface of the first router can provide the router functionality of a second router, if the second router were to fail.

In many RRPs, the second router can also have a physical router interface, for providing its own router functionality, and a virtual router, to act as a back up router for the first router. This can be accomplished by having the virtual router interface of the second router provide the router functionality of the first router, if the first router fails. In this way, two routers can be paired to back each other up.

In most cases, to accomplish a transfer of a first router's workload to a second router, both the first router and the virtual router acting as the back up for the first router in the domain have to have the same network access so that both the first router and its back up router can communicate information between the same resources without having to go through the router that has failed.

In order to provide a back up for a router, addressing information for the physical router that is to be backed up has to be entered into the virtual router interface. For example, the virtual router interface can be set up using an IP address that has been assigned to the physical router interface to be backed up. In an RRP environment, a virtual MAC address can be manually assigned by a user based on the domain in which the set of routers is assigned. The RRP can also use the router identifier of the router on which the interface resides to assign a virtual MAC address. MAC addresses are typically used to identify a particular network adapter connected to the router.

In setting up virtual router interfaces, the set up information for the physical router interface has to be located on the first router, e.g., by a network administrator, copied, and entered into the second router. Additionally, the designation of the redundancy of each router has to be physically, manually entered for each area network on which the RRP is to be used. Address information such as that described above are often mis-entered due to the tedious manual entry of the information. Therefore, information can be entered incorrectly. In many systems, since the information provided is address information that identifies the channel through which data is passed through the router, if entered incorrectly the incorrect addressing information can result in a loss of connectivity through the network and potentially a loss of data.

BRIEF DESCRIPTION OF THE DRAWINGS

FIG. 3 illustrates an example of the set up of an RRP where the routers are communicating with a single network.

DETAILED DESCRIPTION

Figure 1:
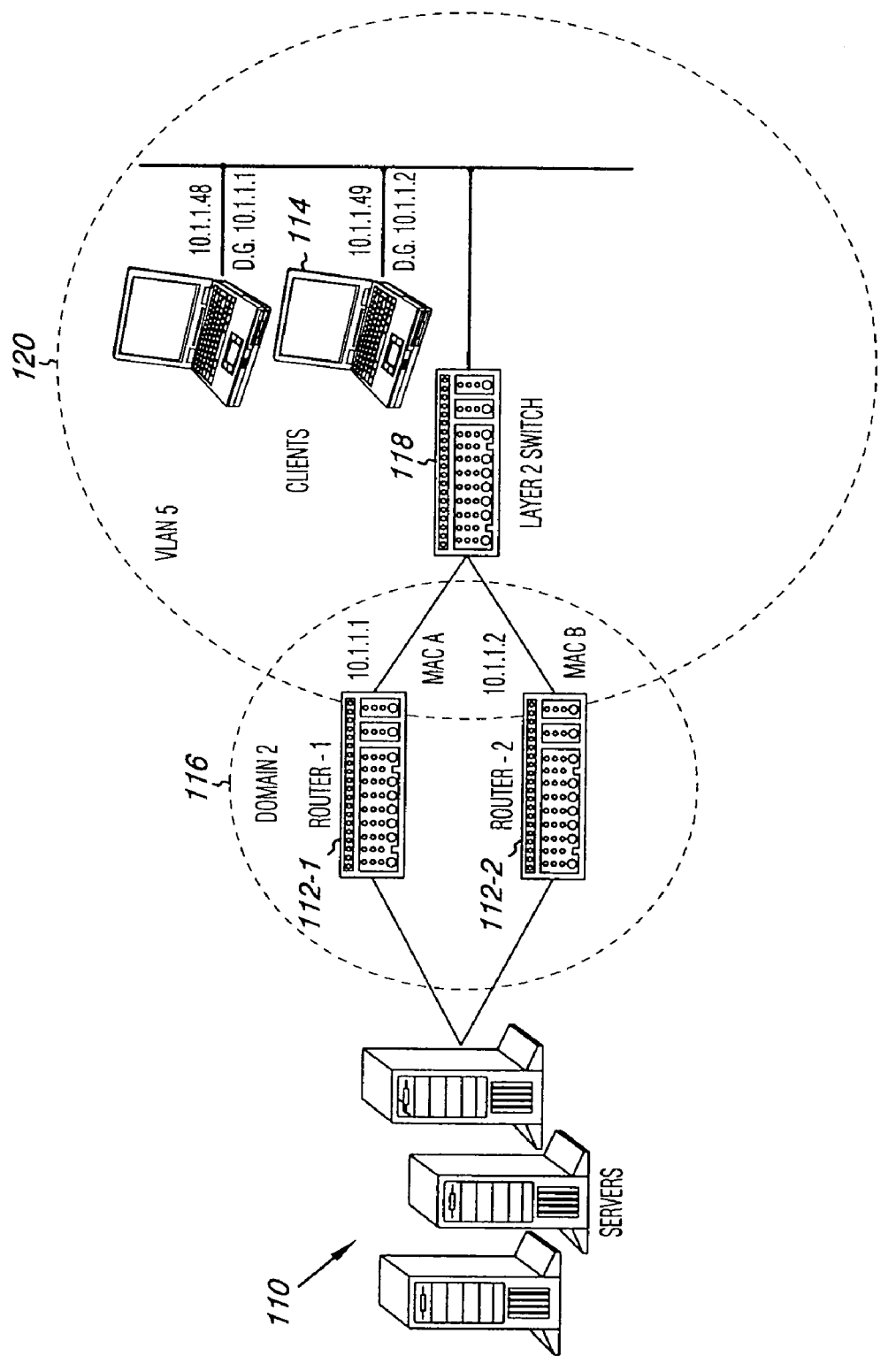
FIG. 1 is a redundant router system embodiment.

Embodiments of the present invention include program instructions which can execute to independently retrieve address information from a router that is to be backed up by another router in case of router failure. In various embodiments, program instructions execute to access a physical router interface and to automatically identify the address information such as, router identifier, IP address, and/or MAC address, among other information.

In various embodiments, program instructions are provided which execute to request address information from a physical router interface that is to be backed up. The physical router interface includes program instructions which execute to provide the information to the virtual router interface that will back up the physical router interface. The program instructions execute to auto-configure the address information of the virtual router interface such that the virtual router interface will accept data packets if the physical router interface, which the virtual router interface is backing up, is inoperable.

For example, during the set up of a virtual router interface, the program instructions of the virtual router interface execute to add the address information received from the physical router interface to the data used to set up the virtual router interface. In this way, the program instructions of the virtual router interface execute to set its own address information to provide router redundancy without a user having to manually enter the information.

In a router redundancy protocol (RRP), each set of routers (e.g., a pair of routers), that are set up to operate to provide router redundancy with one another are grouped together. These groups are often referred to as domains, or protection domains. Within a domain, the routers are assigned identifiers to differentiate one from another (e.g., Router-1 and Router-2). In various embodiments, numbers can be used. However, the embodiments of the invention are not so limited. Domains are used to indicate which routers are to be used to back each other up in case one of the routers has a failure, i.e., becomes inoperable.

Through use of a RRP, if either router in the domain fails, the other router can automatically take over the routing functions of the failed router. For the sake of clarity, a pair of routers will be used to illustrate the embodiments of the invention.

As mentioned above, the previous approaches to entry of the set up information for redundant routers have been to manually enter this information. As such, a domain which includes two routers or more, as with some networks (e.g., a network having 16 domains each with a pair of routers), will include multiple domains that will have to be correctly entered manually.

According to embodiments of the present invention, the transfer of routing functionality is transparent to the equipment. For example, a client device in a network that is in communication with the routers. Embodiments of the invention provide a transparent transfer of routing functionality between the physical router interface and the virtual router interface that provides back up to the physical router interface. In this manner, the virtual router will have the equivalent network access such that the virtual router interface can communicate between the same equipment accessible by the physical router interface it is backing up.

Additionally, in some types of RRPs, the virtual router interface can include program instruction to receive and communicate a copy of the data that is being sent, through the physical router while the physical router is operational. In this way, when the physical router fails, the copied data in the virtual router interface can be passed on. Since a copy of some or all of the data lost by the failure of the physical router interface will be in the virtual router interface when the virtual router interface begins to communicate in place of the failed physical router interface, the amount of data lost by the failure of the physical router interface can be reduced.

In domains having more than two routers, each router can be assigned another router to back up. However, in such embodiments, the routers can be back each other up, but do not have to be paired.

For instance, in a domain having three routers, if two routers are paired and back each other up, then the third router does not have a backup. According to various embodiments of the present invention, program instructions can execute to enable three routers, or more, to back each other up. For example, a first router can back up a second router, the second router can back up a third router, and the third router can back up the first router. In this way, each router has a back up.

In various embodiments, program instructions can execute such that a physical router can have a number of virtual routers created thereon. In this manner, each virtual router can back up a different physical router. For example, in an embodiment having three routers in a domain, one physical router, having two virtual router interfaces, could back up the other two physical routers.

FIG. 1 is a redundant router system embodiment. FIG. 1 illustrates a network having a number of network servers 110 connected via a number of routers 112 to a number of client devices 114. The embodiment of FIG. 1 illustrates a domain 116 (e.g., domain 2) having two routers 112-1 and 112-2 provided therein. Program instructions execute to assign the routers 112-1 and 112-2 to a domain identified as domain 2.

The client devices 114 are shown included within a network 120. Client devices can include handheld devices, such as personal digital assistants, telephones, and the like, and personal computers, such as laptops, desktops, and servers, among other devices. The embodiments shown in FIG. 1 illustrate management of a Virtual Local Area Network (VLAN) as the same is known and understood by one of ordinary skill in the art. However, the network(s) in communication with, or including the routers, can be of various types including, but not limited to, Local Area Networks (LAN), Wide Area Networks (WAN), Metropolitan Area Networks (MAN), or the like. The embodiment of FIG. 1 also includes a switch 118 (e.g., layer-2 switch) provided within the network 120 to direct information between the client devices 114 and the routers 112-1 and 112-2. Additionally, the communication between routers and/or other equipment in the network can be provided by various network protocols including, but not limited to, Simple Network Management Protocol (SNMP), Common Management Information Protocol (CMIP), and Distributed Management Environment (DME), to name a few.

The set up of physical routers 112-1 and 112-2 of the RRP, including the set up of the physical and virtual router interfaces, can be accomplished via equipment on one of the networks to which a router 112-1 and/or 112-2 is connected. For example, a client device 114 on network 120 illustrated in FIG. 1, can execute instructions to set up either router 112-1 or 112-2, since it is in communication with both routers.

In the embodiment shown in FIG. 1, in addition to being assigned to domain 2, program instructions can execute to assign each of the routers 112-1 and 112-2 an IP address (e.g., 10.1.1.1 and 10.1.1.2, respectively). Different IP addresses are provided to each router to enable data packets to be directed to each physical router interface.

Program instructions can execute to assign a router identifier to each router 112-1 and 112-2 (e.g., Router-1 and Router-2, respectively). In this way, program instructions executing the set up of a virtual router can differentiate the physical routers 112-1 and 112-2 within each domain. The router identifier can be a number or other such symbol that can be used to differentiate one router from another.

As shown in FIG. 1, program instructions can execute to assign each router a MAC address (e.g., MAC A and B, respectively). MAC addresses can include six digit numbers that identify each network adapter connected to the router. A network adapter can be plugged into the equipment, such as into the bus of a client device or server in a network, to control the communication of data at the data link level (Open System Interconnect (OSI) layers 1 and 2). A network adapter is also commonly called a "network interface card" (NIC). The first three digits of the address are typically an Organizational Unique Identifier (OUI). The OUI is the part of the MAC address that identifies the vendor of a network adapter. Administration of OUIs is provided by the IEEE. Program instructions can execute to use the MAC address in setting up the virtual router interface in order to identify which network adapter the virtual router is to communicate with or from which network adapter data is to be received.

Within various types of networks, the program instructions can execute to assign each client device a default gateway (d.g.). For example, in FIG. 1, program instructions execute so that the client with IP address 10.1.1.48 is set up to use the virtual router interface at IP address 10.1.1.1, assigned to router 112-1, as its default gateway. Likewise, program instructions execute so that the client with IP address 10.1.1.49 is set up to use the virtual router interface at IP address 10.1.1.2, assigned to 112-2, as its default gateway. In this way, the RRP can be used to provide load balancing as long as both virtual router interfaces are operating normally. In this manner, errors caused by physical mis-entry of data can be avoided.

In various embodiments, program instructions execute in an RRP environment to handle the failure of a router in the following way. If complete access to the network 120 from one of the routers, e.g., 112-1 in the domain 116 fails, program instructions within a virtual router interface that is backing up the physical router 112-1 can execute to automatically transfer the routing functions of physical router 112-1 to the virtual router interface, such as the virtual router interface within physical router 112-2. In various embodiments, in order for a back up virtual router interface to identify when a physical router interface (e.g., 112-1) has failed, program instructions on the virtual router interface execute to monitor the communications between the physical router interface and the equipment it is communicating with, such as the client devices and/or servers shown in FIG. 1.

For example, program instructions can execute to check the activity level of communications, received from a router, by a client device 114. If no information has been received over a time period, program instructions at the back up virtual router interface can execute to take over the operations of the router that has failed or can execute to query the physical router interface that the virtual router interface is monitoring to see if the physical router has failed.

In various embodiments, program instructions within the physical router interface execute to send out RRP signals to the virtual router interface of the other physical router within the domain at a signal interval (e.g., 5 seconds). If the virtual router interface of the other physical router (e.g., 112-2) in the domain 116 does not hear a RRP signal within number of signal interval periods, such as three intervals, the virtual router interface of the other router 112-2 execute program instructions to take control of the IP address and the MAC address of the failed physical router 112-1 or execute program instructions to query the failed physical router.

Figure 2:
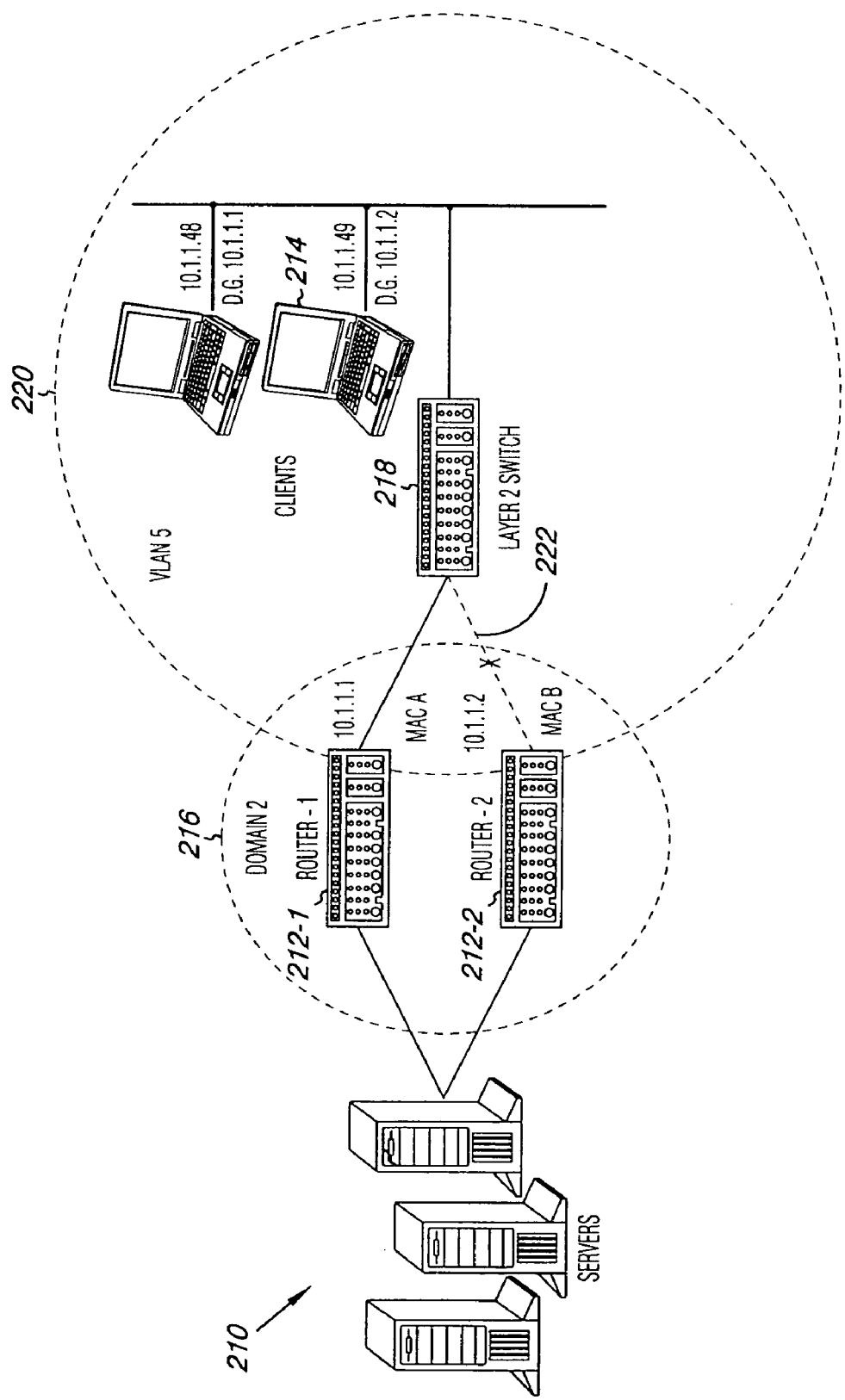
FIG. 2 is an illustration of a fail over on a redundant router system embodiment.

FIG. 2 is an illustration of a fail over on a redundant router system embodiment. FIG. 2 illustrates a network with a number of routers in communication with various network equipment such as a number of network servers 210 in communication with two routers 212-1 and 212-2, within a domain 216, and in communication with a number of client devices 214, within a network 220, via a switch 218. In various embodiments, a network server can serve as a management station. In such embodiments, a management station can execute program instructions to control the communication between the routers and other equipment, among other functions.

FIG. 2 illustrates a situation where the link 222 between the switch 218 and physical router 212-2 has failed. As a result, the virtual router interface on physical router 212-1 no longer can receive RRP signals from physical router 212-2. This indicates that physical router 212-2 has become disabled. In various embodiments, the virtual router interface of physical router 212-1, after not receiving RRP signals from physical router 212-2 for a predetermined period, executes program instructions to take over the IP addresses from physical router 212-2 for the interfaces of network 220 and the virtual router interface can take over the MAC address for physical router 212-2.

In this way, the physical router 212-1 can control its own IP addresses and, via the virtual router interface, the IP addresses for physical router 212-2. The physical router 212-1 also can control its own MAC address and, via the virtual program interface, the MAC address for physical router 212-2.

In various embodiments, if physical router 212-2 is communicating with other networks in addition to network 220, the virtual router interface on physical router 212-1 executes program instructions to take control of physical router 212-2's functions with respect to the other networks in addition to network 220.

Embodiments can also have multiple interfaces to a network such as network 220 of FIG. 2. In various embodiments having multiple interfaces with a network, in order for a fail-over to occur, the failed router has to lose communication on all of its interfaces with a particular network, such as network 220 of FIG. 2, because in such a case, the virtual router interface monitoring the physical router will no longer hear any activity, from the physical router, on the network 220. When the fail-over occurs, for example in physical router 212-2, the virtual router interface of physical router 212-1 executes program instructions to take over to control the IP address for physical router 212-2 with respect to communication with network 220. In various embodiments, if physical router 212-2 has multiple IP addresses in communication with network 220, e.g., a multi-net situation, the virtual router interface of physical router 212-1 executes program instructions to take over all of the IP addresses for physical router 212-2 with respect to communication with network 220.

The virtual router interface can be provided with program instructions executable such that as far as the equipment in communication with the failed physical router is concerned, the transfer of router functionality has been transparent, in that the equipment can still communicate through the virtual router interface using the same IP addresses and MAC addresses as before.

FIG. 3 illustrates an example of the set up of an RRP where the routers are communicating with a network. The embodiment of FIG. 3, illustrates a router pair (described in FIG. 3 as Router-1 and Router-2) with each router backing up the other through use of a virtual router interface provided on each of the routers.

As shown in FIG. 3, an IP address is manually selected and assigned to each router. In the case of Router-1, the IP address that has been assigned is 10.1.1.1, while Router-2's IP address is 10.1.1.2.

The address information can also include a mask length. In a network addressing context, masks are used to identify a number of bits within an address. This number of bits can be allocated to divide a network's resources into a number of sub-networks (also called sub-nets). Accordingly, a mask length is equal to the number of bits in a mask. In the embodiment shown in FIG. 3, a mask length of 24 has been selected. In this context, the number "24" is interpreted by program instructions as 24, such that a mask length of 24 allows for up to 16 sub-nets to be created. The mask length can be changed to accommodate more or less sub-nets. As shown in FIG. 3, program instructions can execute to provide an IP address with a mask length, as shown in FIG. 3 (i.e., 10.1.1.1/24).

A domain identifier is also assigned to each router. In various embodiments, such as those having a single domain, the assignment can be accomplished by execution of program instructions. Since the two routers, described in FIG. 3 are providing router redundancy for each other, they are assigned the same domain identifier, e.g., domain 2. Within the domain, each router has a unique identifier that is assigned to it. In the embodiment shown in FIG. 3, Router-1 is assigned the router identifier "1" and Router-2 is assigned the identifier "2".

Program instructions in connection with a virtual router interface execute to set up the virtual router interface based upon address information of the physical router to which it is to provide back up. This can be accomplished by using program instructions executable to obtain address information from the physical router to be backed up. Once obtained, program instructions can execute to assign the IP address of the physical router to the virtual router interface. Those skilled in the art will understand that an IP address assigned to a virtual router interface can also be referred to as a virtual IP address. For example, as shown in FIG. 3, the address for Router-2 (i.e., 10.1.1.2/24) is assigned to the virtual router created in Router-1. Accordingly, since the pair of routers in this example each provides redundancy for the other, program instructions execute to assign the address for Router-1 (i.e., 10.1.1.1/24) to the virtual router created in Router-2.

As mentioned above, in various embodiments, some or all of the information shown in FIG. 3 is gathered and appropriately recorded by the execution of the program instructions instead of manually entering the information. This can be accomplished by executing program instructions to obtain the address information from a physical router and by executing program instructions to enter the information into the set up of the virtual router interface. Program instructions can also be executed to allow one router to request or access the address information on another router.

Accordingly, program instructions that are executed to manage the physical router can identify the information requested and can execute to communicate the information to the virtual router interface. In this way, program instructions can execute to identify the address information and assign the proper addresses and identifiers without manual entry by a user. Such embodiments can reduce the amount of time and number of errors made as compared to the information being entered manually.

Figure 4:
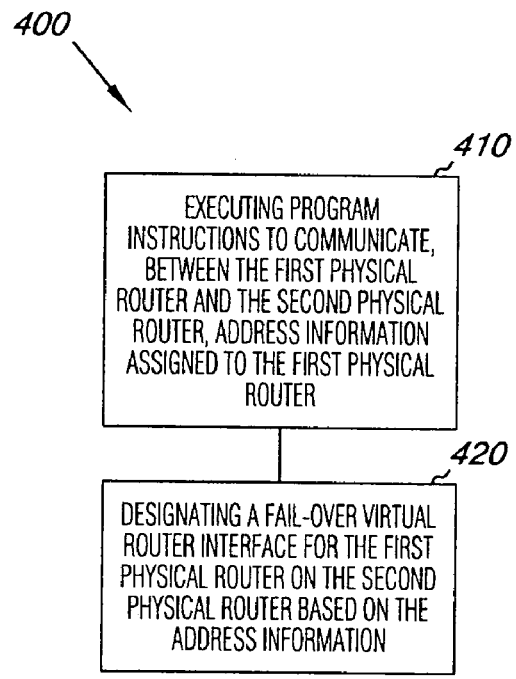
FIG. 4 illustrates a method embodiment of setting up router redundancy between a first router and a second router.
Figure 5:
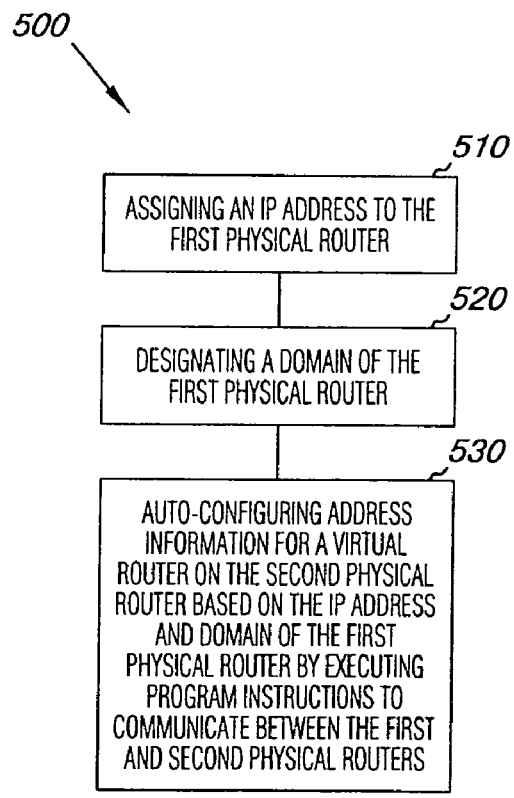
FIG. 5 illustrates another method embodiment of setting up router redundancy between a first router and a second router.

FIGS. 4 and 5 illustrate method embodiments of setting up router redundancy between a first and a second router. Unless explicitly stated, the method embodiments described herein are not constrained to a particular order or sequence. Additionally, some of the described method embodiments or elements thereof can occur or be performed at the same point in time. One of ordinary skill in the art will appreciate that one or more of the various components within the embodiments of the invention can include computer readable media, on which a set of computer executable instructions can reside.

FIG. 4 illustrates a method embodiment 400 of setting up router redundancy between a first router and a second router. As explained in connection with FIGS. 1-3, program instructions can execute to communicate, between the first physical router and the second physical router, address information assigned to the first physical router, as shown in block 410.

The method can also include assigning address information to a physical router and/or virtual router interface based on the address information assigned to one of the physical routers. Address information can include an IP address, a virtual IP address, a mask length, a domain identifier, and/or a router identifier, among other information. As stated above with respect to various embodiments shown in FIGS. 1-3, program instructions execute to assign some or all of the address information to a virtual router.

In block 420, the method includes designating a fail-over virtual router interface for the first physical router on the second physical router based on the address information. The communication with the first router can be accomplished in various manners. For example, communicating can include using a layer-2 packet, such as an RRP packet via an Ethernet connection, among other modes of communication.

The method can also include other set up functions such as assigning address information to the first physical router, designating a domain of the first physical router, assigning a router identifier to the first physical router, setting up a virtual router interface on the first physical router, executing program instructions to communicate, between a first physical router and a second physical router, address information assigned to the second physical router, and/or designating a fail-over virtual router interface for the second physical router on the first physical router, among others.

FIG. 5 illustrates another method embodiment 500 of setting up router redundancy between a first router and a second router. As illustrated with respect to the embodiments of FIGS. 1-3, the method can include assigning an IP address to the first physical router at block 510. The method of FIG. 5 also includes designating a domain of the first physical router at block 520. At block 530, the method includes auto-configuring address information for a virtual router on the second physical router based on the IP address and domain of the first physical router by executing program instructions to communicate between the first and second physical routers.

In addition to the other set up functions mentioned above with respect to FIG. 4, the method of FIG. 5 can also include auto-configuring address information for a virtual router on the first physical router based on the IP address and domain of the second physical router by executing program instructions to communicate between the first and second physical routers.

The method can also include set up functions such as communicating information between the first physical router and the second physical router to obtain a router identifier assigned to the first physical router and/or designating a router identifier of the second physical router based upon the router identifier obtained from the first physical router.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of skill in the art upon reviewing the above description. The scope of the various embodiments of the invention includes various other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network device having router functionality, comprising:
   a processor;
   memory in communication with the processor; and
   program instructions stored in memory and executable on the processor to:
      communicate, between a first physical router and a second physical router, address information assigned to the first physical router and address information assigned to the second physical router;
      designate a domain of the first physical router;
      assign a router identifier to the first physical router;
      set up a virtual router interface on the first physical router;
      designate a fail-over virtual router interface for the first physical router on the second physical router based on the address information assigned to the second physical router; and
      designate a fail-over virtual router interface for the second physical router on the first physical router based on the address information assigned to the second physical router.

2. The network device of claim 1, further including program instructions which execute to assign an IP address for the fail-over virtual router interface of the second physical router.

3. The network device of claim 1, wherein the network device is a management station.

4. The network device of claim 1, wherein the network device is a network switch.

5. The network device of claim 1, wherein the network device is a network hub.

6. The network device of claim 1, further including program instructions which execute to communicate an IP address and domain identifier between the first physical router and the second physical router.

7. A network management system, comprising:
   a first and a second physical router each having a processor and memory in communication with the processor, wherein:
      the second physical router includes:
         means for obtaining address information from the first physical router and communicating the address information to the second physical router;
         means for designating a domain of the first physical router;
         means for assigning a router identifier to the first physical router;
         means for setting up a virtual router interface on the first physical router; and
         means for designating a fail-over virtual router interface on the second physical router based on the address information obtained from the first physical router; and
      the first physical router includes means for designating a fail-over virtual router interface on the first physical router based on the address information obtained from the second physical router.

8. The system of claim 7, wherein the means for obtaining the address information includes program instructions which execute in the first physical router to transfer address information to the second physical router.

9. The system of claim 7, wherein the means for obtaining the address information includes program instructions which execute in the second physical router to receive the address information from the first physical router.

10. The system of claim 7, wherein the means for designating the fail-over virtual router interface includes program instructions stored in the memory and executable on the processor.

11. A non-transitory computer readable medium having a program to cause a device to perform a method, comprising:
   executing program instructions to communicate, between a first physical router and a second physical router, address information assigned to the first physical router;
   designating a domain of the first physical router;
   assigning a router identifier to the first physical router;
   setting up a virtual router interface on the first physical router;
   executing program instructions to communicate, between the first physical router and the second physical router, address information assigned to the second physical router;
   designating a fail-over virtual router interface for the first physical router on the second physical router based on the address information assigned to the first physical router; and
   designating a fail-over virtual router interface for the second physical router on the first physical router based on the address information assigned to the second physical router.

12. The computer readable medium of claim 11, further including assigning a first IP address for a first local area network to the first physical router and assigning a second IP address for a second local area network to the second physical router.

13. The computer readable medium of claim 12, further including designating a fail-over virtual router for the first IP address and designating a fail-over virtual router for the second IP address.

14. The computer readable medium of claim 11, further including assigning a first IP address for a first local area network and assigning a second IP address for a second local area network to the first physical router.

15. The computer readable medium of claim 11, further including communicating between the first and second physical router using a layer-2 packet.

* * * * *